US006279611B2

(12) United States Patent
Uematsu et al.

(10) Patent No.: US 6,279,611 B2
(45) **Date of Patent: *Aug. 28, 2001**

(54) APPARATUS FOR GENERATING MICROBUBBLES WHILE MIXING AN ADDITIVE FLUID WITH A MAINSTREAM LIQUID

(76) Inventors: Hideto Uematsu, 426-15 Noda, Iruma City, Saitama Prefecture (JP); Nicholas Eckelberry, 18081/2 N. Van Ness Ave., Los Angeles, CA (US) 90028

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,866

(22) Filed: May 10, 1999

(51) Int. Cl.[7] .............................. F16K 11/00; B01F 5/00

(52) U.S. Cl. ....................... 137/888; 137/896; 366/175.2; 366/336

(58) Field of Search .................................... 137/896, 888; 366/167.1, 174.1, 175.2, 163.2, 158.5, 336

(56) References Cited

U.S. PATENT DOCUMENTS

| | | | | |
|---|---|---|---|---|
| 1,626,487 | * | 4/1927 | Warren | 366/163.2 |
| 3,376,023 | * | 4/1968 | Lage | 366/167.1 |
| 3,861,652 | * | 1/1975 | Clark et al. | 366/336 |
| 4,049,241 | * | 9/1977 | Taniguchi | 259/4 AC |
| 4,270,576 | * | 6/1981 | Takeda et al. | 137/888 X |
| 4,299,655 | * | 11/1981 | Skaugen | 366/336 X |
| 4,441,823 | * | 4/1984 | Power | 366/167.1 |
| 4,483,805 | * | 11/1984 | Glindsjo | 137/896 X |
| 4,753,535 | * | 6/1988 | King | 366/174.1 X |
| 4,758,098 | * | 7/1988 | Meyer | 366/336 X |
| 4,929,088 | * | 5/1990 | Smith | 366/336 X |
| 5,421,715 | * | 6/1995 | Hofstetter et al. | 366/336 X |
| 5,865,537 | * | 2/1999 | Streiff et al. | 366/174.1 |
| 6,012,492 | * | 1/2000 | Kozyuk | 366/336 X |

* cited by examiner

*Primary Examiner*—Kevin Shaver
*Assistant Examiner*—John Bastianelli
(74) *Attorney, Agent, or Firm*—A. M. Fernandez

(57) ABSTRACT

A unitary, self-contained apparatus for generating microbubbles using a pipe section with a constriction device for producing a venturi effect to cause a mainstream liquid flowing under pressure in the pipe section to draw a column of additive fluid into the mainstream liquid from an aspiration tube for mixing with the liquid and a turbulence part of the pipe section immediately downstream from the constriction device. Protrusions from the inside surface of the turbulence part of the pipe section protrude to at least the theoretical interface between the column of additive fluid and the surrounding mainstream liquid and preferably beyond, where the theoretical interface is a circumference of the column of additive fluid having a radius equal to the radius of the inside surface of the aspiration tube.

3 Claims, 4 Drawing Sheets

APPARATUS FOR GENERATING MICROBUBBLES WHILE MIXING AN ADDITIVE FLUID WITH A MAINSTREAM LIQUID

FIELD OF THE INVENTION

The present invention relates to apparatus for generating microspheres or microbubbles to enhance the blending of a fluid with a mainstream liquid.

BACKGROUND OF THE INVENTION

The increasing amount of chemicals introduced into water systems in homes and small businesses has been identified as one of the largest sources of environmental pollution and this practice continues to grow unabated. When chemicals are introduced into a closed residential water system, they are most frequently discharged directly into an overtaxed municipal waste treatment plant after a single use. Similarly, when chemicals are added in an open residential water system, for example an insecticide which is added to water by mixing through a gardening hose, most of the chemicals will eventually flow into the water table or catch basin to be recycled into the municipal water system.

There are many prior-art devices used for mixing or otherwise dispensing liquid chemicals in a residential or business water system. Most of these devices are used to dispense liquid soap, shampoo, insecticide, fertilizer or other additives in a stream of water by means of the force of the water under pressure through a faucet, shower head, garden hose, or the like. Some devices allow a user to choose between a variety of additives to be dispensed into the stream of water. Others allow the user to select a dilution ratio of an additive to be dispensed into the water stream. Still other devices are adaptable for use in a wide variety of residential and commercial applications including bath, kitchen, and garden.

All applications of the prior-art devices are primarily concerned with achieving a higher level of convenience and ease of use in dispensing additives in water. The prior art does not, however, seek to enhance the efficacy of an additive in order to allow reduction of the ratio of additive otherwise required to accomplish a given task, thus reducing the gross amount discharged into the municipal waste disposal system or the ground.

The present invention distinguishes itself from the aforementioned prior art in that it is capable of increasing the efficacy of the additive dispensed in the water, thus allowing a reduction in the gross amount of additive used to accomplish a given task. This increase of efficacy of an additive is made possible by apparatus in the mixing device that generates microspheres of the additive in the water stream for greater surface contact of the additive in the water, particularly in situations where the two fluids being mixed are incompatible or otherwise mutually repellent, such as oil and water. It has been demonstrated that microsphere technology accomplishes the mixing of such incompatible liquids, without the use of emulsifiers or other binding agents.

The present invention accomplishes this increase of efficacy by exploiting incipient cavitation nuclei inherent in liquids and their unique properties upon implosion, including shockwave and ultrasound generation. Microspheres, which are created when two liquids are combined have a mean diameter of under 100$\mu$ (0.1 mm). The prior art has demonstrated that liquids in a micron state will provide dramatically accelerated mutual physical and chemical interaction with each or other and often attain a 30% or higher reduction in ratio of additive required to attain a given result.

As shown in the prior art, microsphere generation arises from the inherent presence of incipient cavitation nuclei in liquids. Cavitation is the process whereby microsphere form, grow, and collapse due to pressure differentials created in a liquid. Tremendous local energy is released when a microsphere collapses which causes a disproportionately increased rate of physical and chemical interaction between molecules of any additive and its surrounding liquid. This then greatly enhances the efficacy of the additive in the mixture.

There are four basic methods of inducing cavitation: hydrodynamic, acoustic, optic and particle. The present invention makes use of a hydrodynamic method produced by pressure variations in a flowing liquid due to the geometry of the system. Cavitation occurs when the net pressure of the flowing liquid becomes approximately equal to the vapor pressure of the liquid.

Despite the fact that cavitation generation of microsphere and the generation of the associated phenomena of ultrasound and shockwave has long been held to be particularly detrimental in hydrodynamic systems, the commercial, medical, and scientific communities have nonetheless begun to successfully exploit beneficial aspects of this technology to dramatically improve physical and chemical reactions as well as permit previously unattainable reactions and emulsions. A wide variety of methods have been developed by those communities to generate microsphere including electrically generated ultrasonic vibrations, ceramic contact plates, cross-membranes, certain venturi configurations with external pumps, small scale oxygen injection apparatuses, and microbiological reactions, among others.

Commercial communities have utilized microbubble technology to sharply improve chemical and physical reactions such as mixing, heat exchange, flocculation, oxidation and reduction in fields as diverse as synthetic gas production, cancer imaging, wastewater treatment and mineral processing. Scientific and medical communities have utilized microbubble technology to open new lines of research in cold fusion, non-invasive surgical procedures, and transdermal therapy, among others. However, the means used by those communities for producing microbubbles and utilizing the beneficial properties resulting therefrom cannot be easily adapted to home use for a variety of reasons. For example, a pump or electrical device is usually involved which gives rise to concerns about safety, size, and cost that would preclude home use. Being generally highly sophisticated in nature, these systems for production of microbubbles present difficulties not easily overcome in the areas of mass-market manufacturing, installation and operation and thus are not currently available for home or other uses requiring low cost production for mixing a fluid gas or liquid with a mainstream liquid.

What has not been generally appreciated by the prior art is that hydrodynamic cavitation per se is not necessarily a negative externality that should always be avoided altogether in hydrodynamic systems. What the present invention seeks to exploit is that in hydrodynamic cavitation in the mainstream of a liquid, the liquid system itself can be utilized to generate microsphere and its associated phenomena to achieve a variety of benefits, one of which is the reduction of the ratio of an additive fluid to the mainstream liquid in order to reduce the additive needed in the mainstream liquid.

The present invention can achieve mixing at the micron level without altering the infrastructure of a residence or small business through the use of microbubbles. Because the present invention can be powered solely by the pressure of a mainstream liquid flowing from a source and utilizes no electricity, pump, or other mechanical devices, the power of a municipal water system is sufficient for the present invention to attain mixing of fluids in a mainstream flow of water at a micron level, such as detergents or chlorine, despite pressures as low as 25 PSI and low flow rates of 2.25 to 5.0 gallons per minute. Certain types of industrial static mixers, e.g., U.S. Pat. No. 4,270,576 (Takeda), operate with electricity, pump, or other external means and therefore cannot be self-contained for insertion in a residential or small business water system, such as in a clothing or dish washing system.

SUMMARY OF THE INVENTION

In accordance with the present invention, apparatus for mixing a liquid with a liquid of a primary stream comprises a section of pipe or tube attachable to a source of mainstream liquid under pressure. The defined space in the section of tube is provided with a constriction device between its inlet and outlet for the purpose of increasing the velocity of the mainstream flow of liquid through the constriction device and thus lowering the pressure of the mainstream liquid at the constriction in accordance with Bernoulli's principle. An aspiration tube having an outer diameter substantially smaller than the inner diameter of the tube section and having its inlet coupled to a source or reservoir of the additive liquid to be mixed with the main stream of liquid has its outlet centrally disposed upstream in the tube section and proximate to the constriction device such that low pressure of the main stream of liquid flowing around the aspiration tube and through the restricted space between the aspiration tube outlet and the constriction device produces a venturi effect so that the fluid is drawn from the aspiration tube into the mainstream of liquid.

The liquid drawn from in the aspiration tube will initially form a column surrounded by the mainstream liquid as that mainstream liquid begins to decelerate. In order to promote cavitation, i.e., the formation of microsphere in the mainstream liquid for optimal mixing or blending of the column of additive liquid with the mainstream liquid, staggered pins are provided that extend out from the wall of the pipe towards its axis in a section downstream from the constriction device. The length of these pins is chosen to be approximately equal to the theoretical distance from the wall to the interface of the column of additive liquid and the surrounding mainstream liquid. Since that interface is not precisely defined due to the fact that some blending will begin to occur immediately after the exit of the additive liquid from the aspiration tube, the theoretical interface may be taken to be at least at the center of that region of initial blending and preferably the inner circumference of that region. The purpose of the protruding pin is to create microscopic turbulence in the region of blending for optimal inducement of cavitation, which is to promote the formation and activity of microspheres in the liquid for maximum blending of the additive liquid with the mainstream liquid.

The novel features that are considered characteristic of this invention are set forth with particularity in the appended claims. The invention will best be understood from the following description when read in connection with the accompanying drawings.

DETAILED DESCRIPTION OF INVENTION

Figure 1:
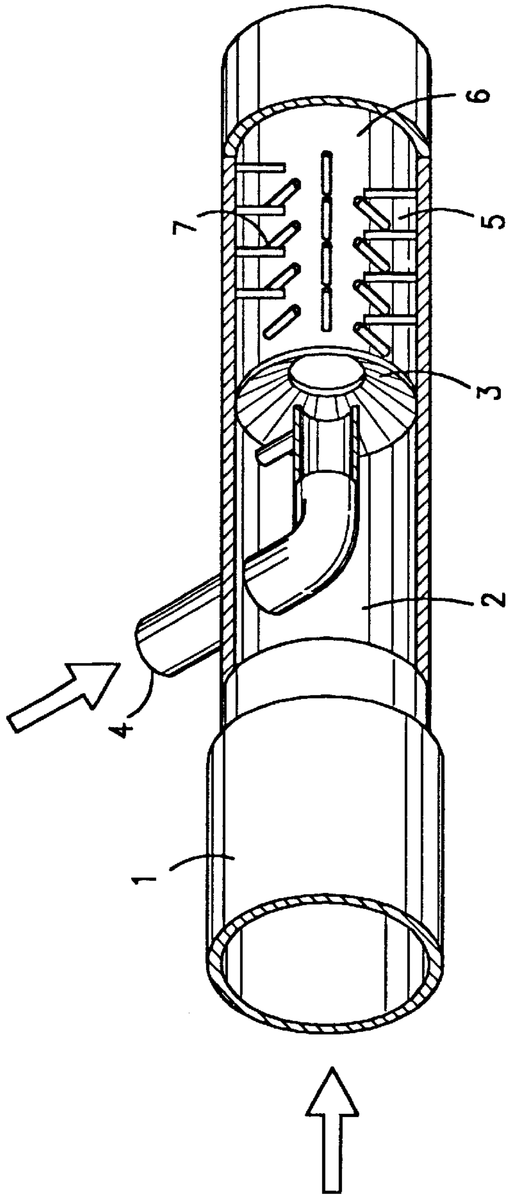
FIG. 1 is a perspective view of a first embodiment of the present invention using a straight-through flow pipe or tube section 2 and an aspiration tube 4 in front of a flow constriction device 3 in the form of a truncated conical surface followed by a turbulence section 5 with protuberances 7 and a pressure reduction section 6.

The embodiments of the invention illustrated in the drawings are directed to the provision of apparatus for generating microspheres while mixing a additive liquid with a mainstream liquid at a micron level using the mainstream liquid pressure without the use of any other source energy, or other devices, based on the current theories of cavitation generating microspheres described as follows.

This invention exploits the presence of incipient cavitation nuclei present in liquids. That nuclei, when stretched, subsequently collapses and produces the phenomenon known as cavitation that results in microspheres. Cavitation occurs when variational tensile stresses are superimposed on the prevailing ambient pressure of a flowing liquid such that the total net pressure becomes approximately equal to the vapor pressure of the liquid. While there exist alternative theories that might also explain this cavitation reaction, hydrodynamic cavitation seems to be the most appropriate explanation underlying the effects produced by the present invention.

Referring now to FIG. 1, a detailed perspective view of a first embodiment of the present invention is shown comprising a straight-through section of pipe or tube 2 which can be made from a variety of inexpensive materials and which is installed or attached by a coupler 1 to the end of or within a standard plumbing fixture or configuration (not shown) such as a water tap, faucet, showerhead, garden hose, washing machine water hose, dishwasher water hose, or the like. The mainstream liquid flowing through the tube 2 and comes into contact with a flow constriction device 3 in the form of a truncated conical surface oriented so that the liquid must pass through the base thereof (having a diameter equal to the diameter of the tube 2) and out of the open end thereof, the diameter of which open end is less than the diameter of the tube 2, thereby creating a venturi effect as the mainstream liquid passes therethrough. That in turn creates a progressively decreasing pressure zone within the constriction device 3 which draws an additive fluid out of an aspiration tube 4., having an outer diameter substantially smaller than the inner diameter of the tube 2 and having an outlet disposed centrally and coaxially with respect to the tube 2 proximate the constriction device 3, somewhere between the base and open end thereof. The mainstream liquid entrained with additive liquid and ambient air drawn from the aspiration tube 4 mix as they enter a reaction chamber 5. A central high pressure liquid jet created by the constriction device 3 is located at the core of the mixture entering the reaction chamber 5.

The additive liquid flow through the aspiration tube 4 is not intended to be present at all times. Instead, an on/off valve (not shown) is momentarily turned on such that ambient air (trapped in the aspiration tube until the valve is turned on) will be entrained with the additive liquid to be mixed. Entrained air does not have any adverse effect on the operation of the invention but rather is believed to aid in the generation of microspheres. On the other hand, its presence is not deemed to be critical.

It is believed that the additive liquid enters the reaction chamber 5 in a column with the mainstream liquid swirling around the column of additive liquid, but whether or not the mainstream liquid is swirling, it is known to be surrounding the column of additive fluid liquid mainstream not already mixed around that central column of additive liquid tend to move outwardly towards the mainstream liquid as the column expands and come into contact with a plurality of protuberances 7 that protrude into the core of additive liquid. Collision of the additive liquid with the protuberances 7 creates a number of vortices and low and high pressure zones whereby transient and incipient cavities inherent to the liquid being mixed are stretched and pulled. Upon exit from the reaction chamber 5, the liquid with stretched cavities enter a downstream zone 6 of the tube 2, defined by the absence of any protuberances, where the stretched cavitation nuclei collapse or implode onto each other causing the phenomenon known as cavitation followed by the production of microspheres accompanied by shockwaves. The microspheres flowing out of the zone 6 explode, thereby completing a thorough mixture of mainstream liquid with additive liquid and in the process producing ultrasound waves.

Although FIG. 1 shows a typical embodiment of the present invention, it will be appreciated that variations in the overall design geometry of the apparatus, as well as variations in the flow constriction device configuration and the protuberances will occur to those skilled in the art.

Figure 2:
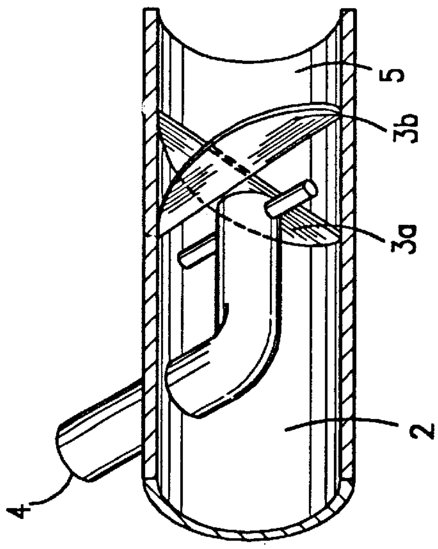
FIG. 2 is a perspective view of a second embodiment of the invention using a constriction device consisting of two opposing flow deflectors 11, 12 in the form of semidiscs at opposing angles with respect to mainstream liquid flow through the tube section.

FIG. 2 illustrates an alternate flow constriction device to be compared and contrasted to that of FIG. 1. in which the flow constriction device 3 is in the form of a three-dimensional surface of a truncated cone coaxially attached to the wall of the tube 2, as shown, with its central opening at the opposite end sufficiently small as to cause a venturi effect of increasing the velocity of the main stream liquid flow therethrough as its pressure is reduced with the maximum reduction of pressure at the outlet opening, thus allowing the mainstream of liquid to effectively "draw" additive liquid at a higher pressure from the aspiration tube 4 as the mainstream liquid passes through the constriction device 3. In contrast, the flow constriction device 3' in FIG. 2 comprises two semidisc flow constriction panels 3*a*, 3*b* positioned at an acute angle to each other and attached to the wall of the tube 2, thus leaving a restricted space between the panels and the aspiration tube 4 to permit the mainstream of liquid and entrained fluids to pass therethrough with a swirling motion since flow restriction panels 3*a* and 3*b* impart circular deflection to the flow with attendant increase in velocity and decrease in pressure of the mainstream liquid and entrained fluids. It is to be understood, however, that such flow constriction devices shown in FIG. 1 and FIG. 2 are for illustrative purposes only, and that other flow constriction devices of different design or shapes can be used to accomplish the aforementioned creation of the venturi.

Figure 3:
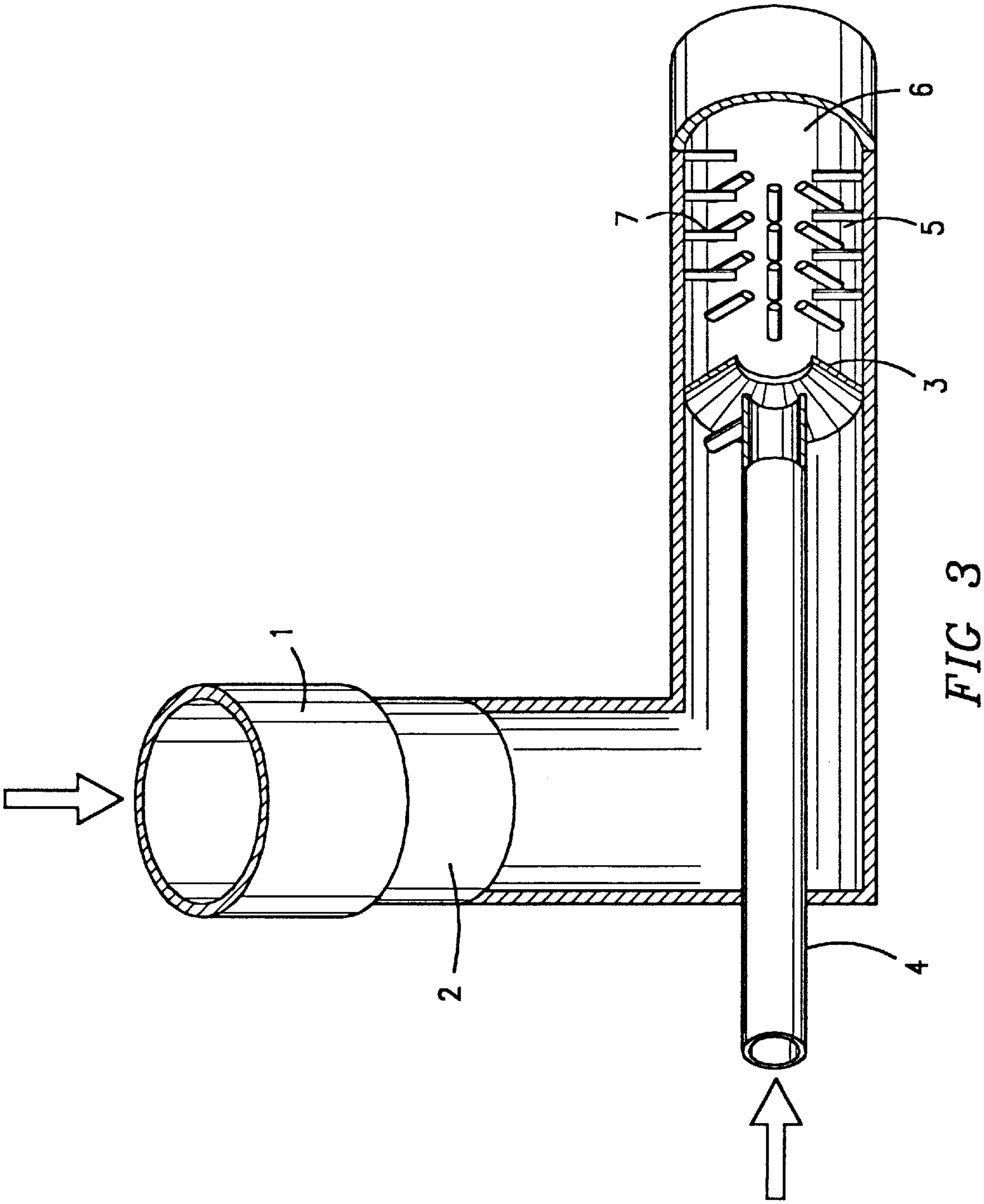
FIG. 3 is a perspective view of another embodiment of the invention having an alternate geometry, namely an L-shaped cylinder or tube section, in order that the aspiration tube need not be bent.
Figure 4:
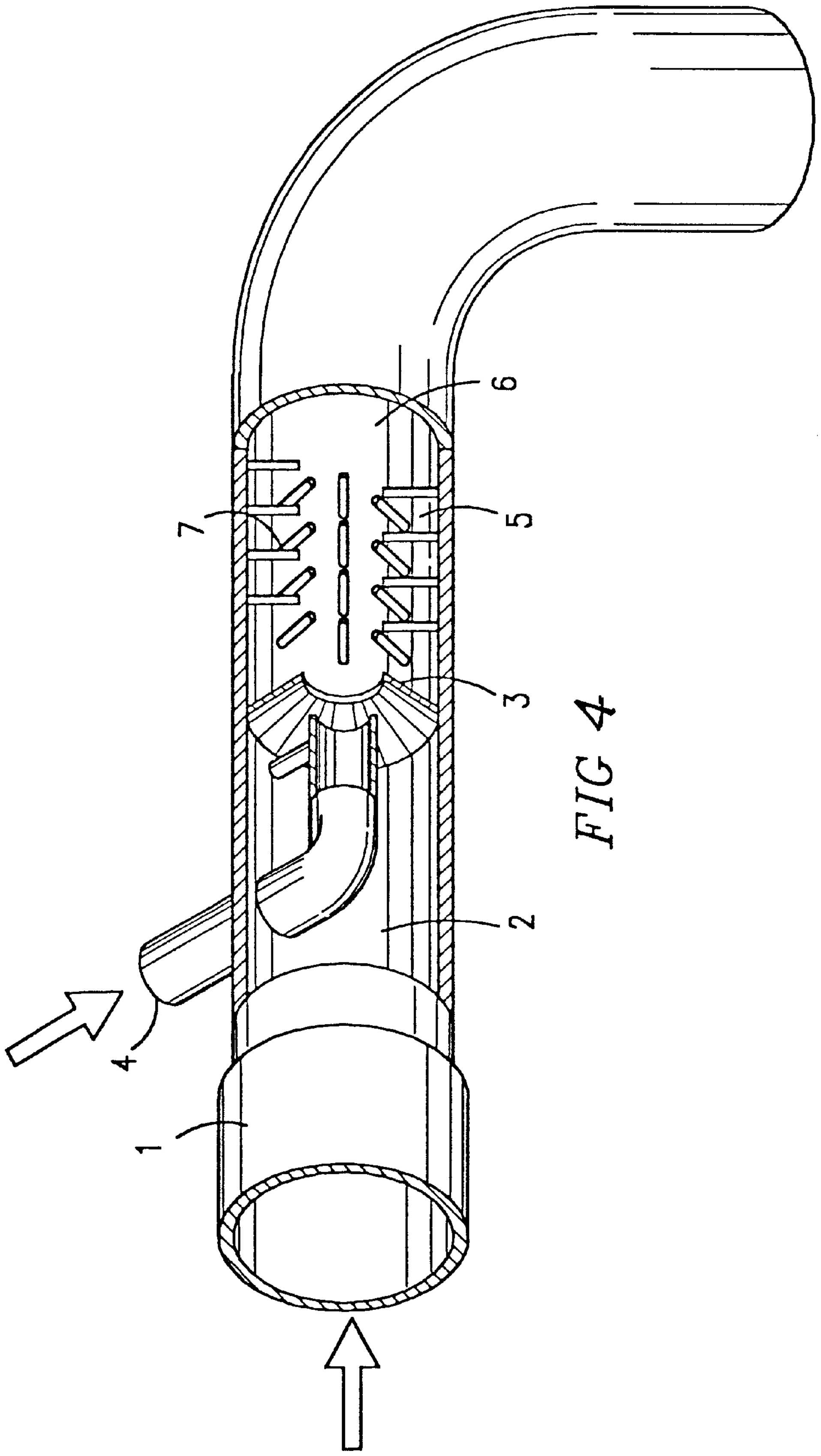
FIG. 4 is a perspective view of the invention shown in FIG. 1 incorporated in a sink faucet 9.

FIG. 3 illustrates an alternate overall design geometry of the apparatus wherein the tube 2' is L-shaped. An advantage of the L-shaped tube 2' is that the aspiration tube 4' is then straight so there is no restriction to the flow of additive liquid and any entrained air. Although the L-shaped tube 2' results in a slight decrease in the overall flow rate of the system, it would not noticeably alter the effectiveness of the apparatus.

In both embodiments, the space between the tips of the opposing protuberances is preferably equal to the inner diameter of the aspiration tube. In the embodiment of FIG. 1, the outlet of the aspiration tube 4 is spaced upstream from the constriction device 3 and has an inner diameter less than the diameter of the downstream opening of that constriction device, both of which serve to allow the additive liquid being aspirated and the mainstream liquid to flow with the additive liquid flowing in a column surrounded by the mainstream liquid. The protuberances 7 are selected to be of a length sufficient to at least extend through the mainstream liquid to the inner column of additive liquid and preferably slightly into the column of additive liquid. Consequently, an acceptable criterion is a protuberance length approximately equal to the distance from the inner surface of the tube 2 to the inner surface of the aspiration tube 4 at the outlet thereof.

The same criterion applies in the embodiment of FIG. 2 where the constriction device is comprised of two semidiscs 3*a* and 3*b* which together impart a swirl in the downstream flow of the mainstream liquid and at the same time produces a low pressure area inside the swirl as the velocity of the liquid increases. The low pressure inside the swirl then draws a column of additive liquid into the chamber 5 downstream of the constriction device semidiscs 3*a* and 3*b*. In this case, the swirling mainstream liquid surrounding the additive liquid will tend to confine the additive liquid to a column having a diameter equal to the inside diameter of the aspiration tube outlet. However, the greater velocity of the swirling liquid produces a shearing stress at the interface between the column of additive liquid and the swirling mainstream liquid. This adds to the tensile stress in the transient cavities, that are produced y the protuberances (not shown) in the chamber 5 thus promoting greater hydrodynamic cavitation. Nevertheless, the same protuberances should meet the same criterion as in the first embodiment shown in FIG. 1, i.e., should extend at least through the swirling mainstream liquid, to and preferably into the column of additive fluid.

In general, for purposes of the present invention, the design of the solid protuberances may take a variety of shapes. For instance, any polyhedral column or pyramid may be used to provide or induce the formation of a series of high and low pressure zones in the reaction chamber 5 through which the flow stream passes to produce turbulence without any deviation from the spirit and scope of the present invention, thereby promoting the cavitation of fluids passing through reaction chamber 5. Similarly, the placement of staggered protuberances along the inner wall of reaction chamber 5 may be either zigzagged along lines parallel to the tube axis as shown in FIG. 1 or along spaced circular lines around that axis or both. The objective is to use an arrangement of protuberances which provide maximum turbulence by collision with protuberances. Thus, a multitude of low and high pressure zones affecting the fluids (additive fluid and air) and mainstream liquid being mixed are created as they pass through the reaction chamber 5. That enhances cavitation that is followed by the creation of microspheres which in turn maximizes the mixing of additive fluid (liquid or gaseous and entrained air) with the mainstream liquid.

Figure 5:
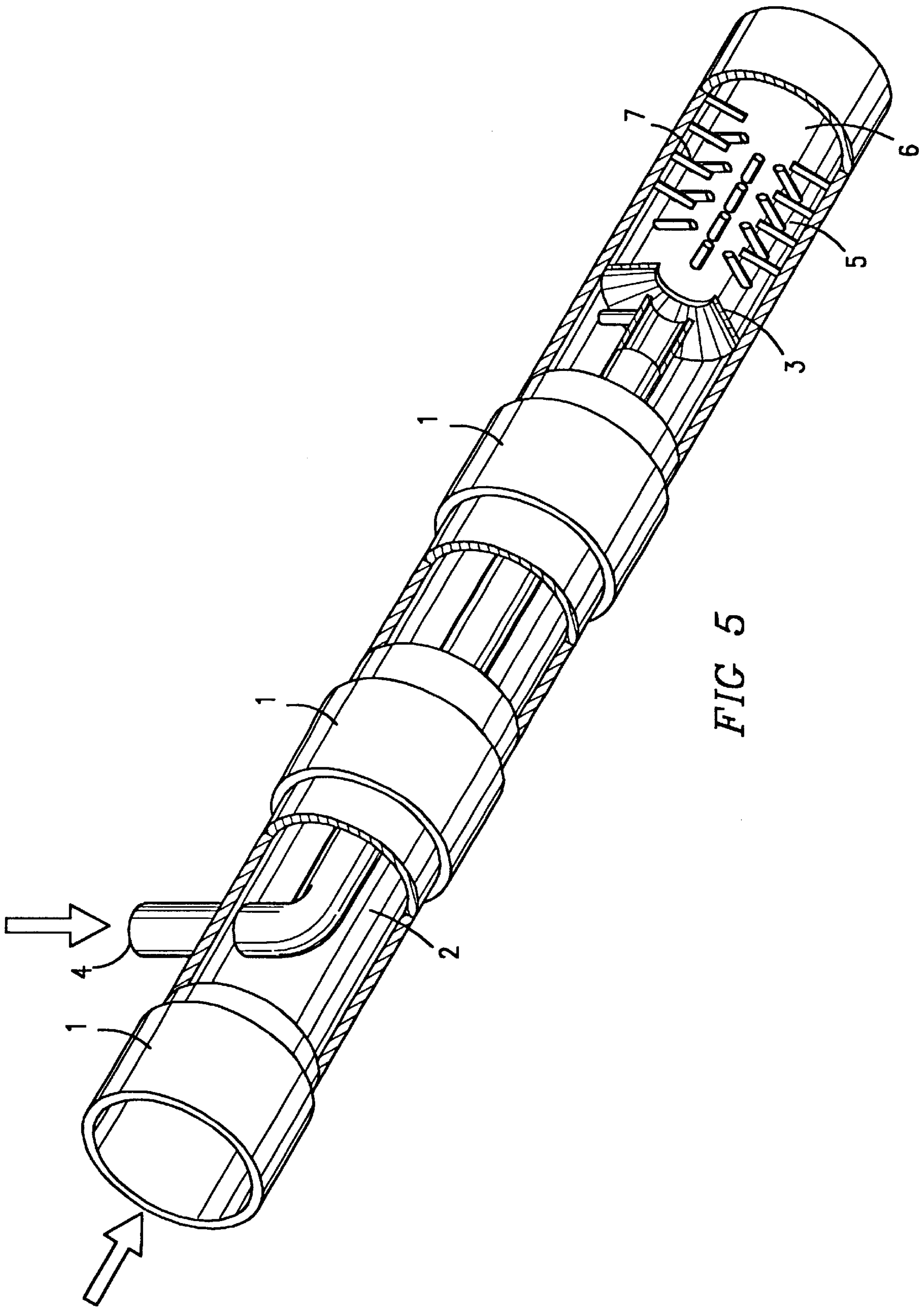
FIG. 5 is a perspective view of the present invention shown in FIG. 1 with the aspiration tube commencing at a remote distance from the flow constriction device and extending centrally and coaxially through an extender tube section 10 or hose to a position proximate the flow constriction device.

As shown in FIG. 1, FIG. 3, and FIG. 5, the position and design of aspiration tube 4 may easily be modified to adapt it to various overall system design considerations relating to application constraints that require an extender 10 for the tube 2, provided that the inlet of the aspiration tube 4 commences at a point upstream from the constriction device 3 and the outlet of the aspiration tube 4 is aligned with the center line of the constriction device 3 and between a plane at the front of the constriction device (defined by its circumference connected to the tube wall) and the opening at the outlet thereof to allow some significant space for flow of mainstream liquid from the inlet of the tube 2 but preferably at the front plane of the constriction device. It will also be appreciated by those skilled in the art that the aspiration tube 4 can be used in conjunction with any number of available additive liquid dispensing systems, including multiple fluid dispensing systems, as the aspiration created by the venturi-effect of the constriction device is strong enough to draw but the most viscous liquid into the apparatus. Additionally, it will be appreciated by those skilled in the art that other configurations for additive liquid introduction systems may readily occur to those skilled in the art without significantly altering the spirit or results of the present invention.

Although a description of the present invention has been illustrated in various configurations, and one application has been illustrated in connection with a sink faucet, it should be appreciated that the invention may be adapted to many medical and scientific applications as well as other residential applications, and although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. Apparatus for generating microspheres while mixing an additive liquid with a mainstream liquid in order to enhance the blending of said additive liquid with said mainstream liquid, said apparatus having: a section of a pipe of uniform diameter from an inlet to receive a mainstream liquid flowing under pressure to an outlet; a flow constriction device affixed to an inside tubular surface of said section of pipe between said inlet and said outlet, thereby producing a venturi effect of increasing the velocity of said mainstream liquid through said constriction device in order to lower the pressure of said mainstream liquid flowing therethrough; an aspiration tube having an outer diameter less than an inner diameter of said pipe section, said aspiration tube having an inlet to receive an additive liquid to be mixed with said mainstream liquid and an outlet affixed inside said section of pipe in a position centrally disposed upstream with respect to said constriction device and proximate thereto, whereby lowered pressure of said mainstream liquid flowing around and past said aspiration tube through restricted space between said aspiration tube outlet and said constriction device produces said venturi effect of lowering the pressure of said mainstream liquid passing through said constriction device in order to draw additive liquid from said aspiration tube for mixing with said mainstream liquid, said apparatus further having a turbulence part of said section of pipe immediately downstream between said constriction device and said aspiration tube outlet, and a plurality of staggered protuberances inside said turbulence part of said pipe section protruding radially from the inside surface thereof toward an axis thereof to a point spaced from said surface a distance equal to approximately the distance from said pipe section to the inside surface of said aspiration tube, whereby each of said protuberances creates a disruption of the flow of said mainstream liquid and additive liquid, thereby to enhance a mixture of said mainstream liquid and additive liquid and cause variational tensile stresses in the flow of said mixture to generate microspheres in said mixture.

2. Apparatus for generating microspheres while mixing an additive liquid with a mainstream liquid as defined in claim 1 wherein said constriction device is a truncated conical surface having its base affixed to the inside surface of said pipe section for receiving said mainstream liquid directly from said inlet of said pipe section and having a smaller diameter open end positioned downstream from said base, and wherein said outlet of said aspiration tube is affixed to said pipe section upstream from and proximate to said open end of said truncated conical surface.

3. Apparatus for generating microspheres while mixing an additive liquid with a mainstream liquid as defined in claim 1 wherein said constriction device comprises two semidisc panels, each affixed along their arcuate edge to the inside surface of said pipe section with their straight edges crossing at an acute angle with respect to each other at their centers, centrally disposed downstream from said outlet of said aspiration tube and proximate thereto, thereby providing a space between said outlet of said aspiration tube affixed between said semidisc panels and said aspiration tube, whereby said semidisc baffles impart a swirling motion of said mainstream liquid in said space to increase the velocity and decrease the pressure of said mainstream liquid, thereby producing a venturi effect in order for said mainstream liquid flowing past said aspiration tube outlet to draw additive fluid from said aspiration tube outlet.

* * * * *